United States Patent Office 3,275,661
Patented Sept. 27, 1966

3,275,661
EPOXY COMPOUNDS
Gustav Widmer, Basel, Hans Batzer, Arlesheim, and Erwin Nikles, Basel, Switzerland, assignors to Ciba Limited, Basel, Switzerland, a Swiss firm
No Drawing. Filed Mar. 1, 1960, Ser. No. 11,964
Claims priority, application Switzerland, Mar. 5, 1959, 70,384; Sept. 10, 1959, 78,067
1 Claim. (Cl. 260—348)

The present invention provides new epoxy compounds of the general formula

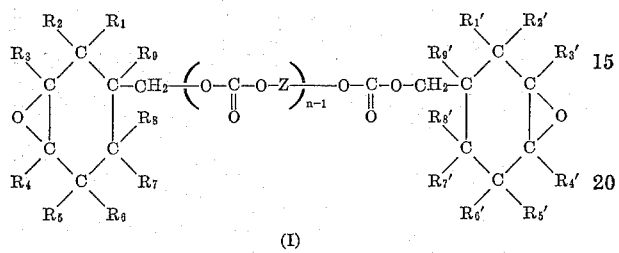

(I)

in which $R_1$ to $R_9$ and $R_1'$ to $R_9'$ represent monovalent substituents such as halogen atoms or alkoxy groups or aliphatic, cycloaliphatic, araliphatic or aromatic hydrocarbon residues, preferably lower alkyl radicals containing 1 to 4 carbon atoms, or represent hydrogen atoms, and $R_1$ and $R_5$ together, or $R_1'$ and $R_5'$ together, may also represent a bivalent substituent, such as methylene group; Z represents an aliphatic, cycloaliphatic, araliphatic or aromatic residue and $n=1$ or 2.

According to the invention the new compounds are obtained when a carbonic acid ester of the general formula

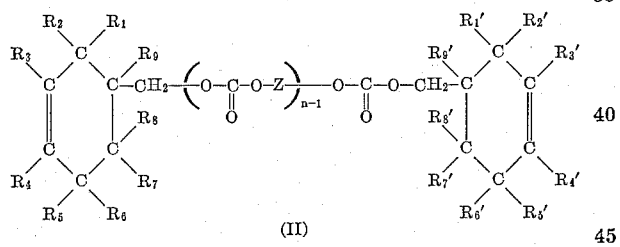

(II)

—where $R_1$ to $R_9$, $R_1'$ to $R_9'$, Z and $n$ have the same meanings as in the Formula (I)—is treated with an expoxidizing agent.

The epoxidation of the C=O— double bonds is performed in the present invention by a conventional method, preferably with the aid of an organic per-acid, such as peracetic acid, perbenzoic acid, peradipic acid, monoperphthalic acid, or the like. Another suitable epoxidizing agent is hypochlorous acid; in this case in a first stage the double bond is additively combined with hypochlorous acid and in a second stage the epoxide group is formed upon reaction with an agent capable of splitting off hydrochloric acid, for example a strong alkali.

In addition to the polyepoxides, the epoxidation may concomitantly also lead by way of secondary reactions to wholly or partially hydrolyzed epoxides, that is to say, compounds in which the epoxide groups of the polyepoxide of the Formula I have been wholly or partially hydrolyzed to hydroxyl groups.

It has been observed that the presence of such by-products has as a rule a beneficial influence on the properties of the hardened polyepoxides and it is, therefore, in general of advantage to dispense with the isolation of the pure diepoxides from the reaction mixture.

The epoxides obtained by the present process belong to one of two groups, depending on whether in the Formula I $n=1$ or 2.

When $n=1$, the epoxide corresponds to the general formula

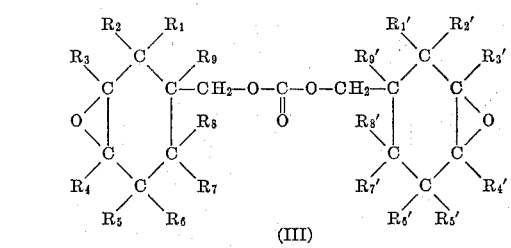

(III)

whereas when $n=2$, the resulting epoxide corresponds to the general formula

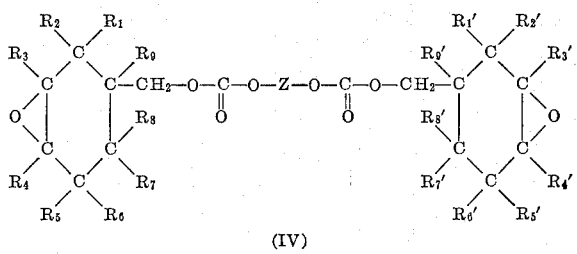

(IV)

The bivalent radical Z in the Formula IV may be an unsubstituted or substituted aliphatic, cycloaliphatic, araliphatic or aromatic hydrocarbon radical; suitable substituents are, for example, hydroxyl groups, ether groups, sulfide groups, carboxyl groups, carboxylic acid ester groups, keto groups, acetal groups, or the like.

As a special case of considerable importance may be mentioned that the radical Z may also be substituted by more than 2, for example by 3, 4 or more, carbonic acid ester groups of the formula

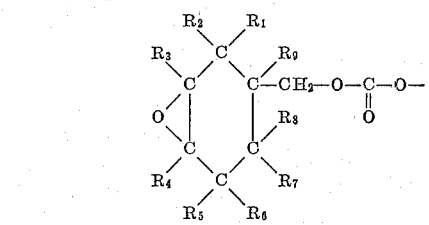

Particularly readily accessible are carbonic acid esters of the general formulae

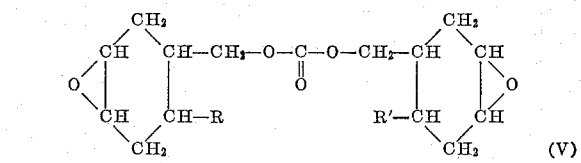

(V)

and

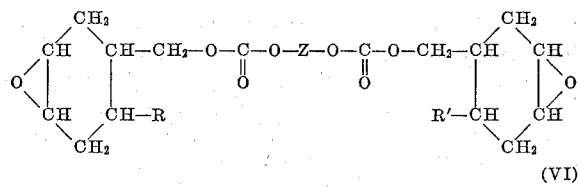

(VI)

in which R and R' represent a hydrogen atom or a lower alkyl radical each, and Z has the same meaning as in the Formula I.

The epoxides of the present invention are light-colored resins that are liquid or fusible at room temperature, and can be converted with suitable hardeners, such, for example, as dicarboxylic acid anhydrides, into clear and light-colored, hardened products having good properties. Among them the epoxides of the Formulae IV and VI are distinguished by specially valuable properties, more especially those epoxides in whose formulae the radical Z represents the hydrocarbon radical of a diphenol, more especially the radical of bis-[4-hydroxphenyl]-dimethylmethane.

The starting materials used in the manufacture of the epoxides of the Formula III are compounds of the general formula

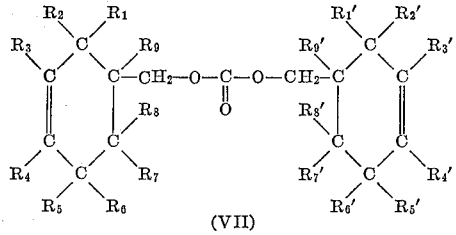
(VII)

in which $R_1$ to $R_9$ and $R_1'$ to $R_9'$ have the same meanings as in the Formula I. These starting materials are themselves available by reacting at least 2 mols of an alcohol of the formula

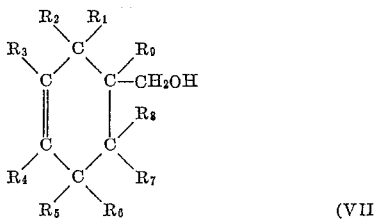
(VIII)

or of a mixture of two or more such alcohols, with 1 mol of phosgene or with 1 mol of a carbonic acid ester by a known method. In the above formulae $R_1$ to $R_9$ have the above meanings.

Depending on whether the starting material is a unitary alcohol of the Formula VIII or a mixture of two or more such alcohols, symmetrically constituted carbonic acid esters are obtained or mixtures of both symmetrically and asymmetrically constituted carbonic acid esters.

The unsaturated cyclic alcohols of the Formula VIII are derivatives of tetrahydrobenzene; there may be mentioned $\Delta^3$-tetrahydrobenzyl alcohol, 6-methyl-$\Delta^3$-tetrahydrobenzyl alcohol, 1-methyl-$\Delta^3$-tetrahydrobenzyl alcohol, 2:5-endomethylene-$\Delta^3$-tetrahydrobenzyl alcohol, 2:4:6-trimethyl-$\Delta^3$-tetrahydrobenzyl alcohol and 4-chloro-$\Delta^3$-tetrahydrobenzyl alcohol.

The epoxides of the Formula IV are prepared from compounds of the general formula

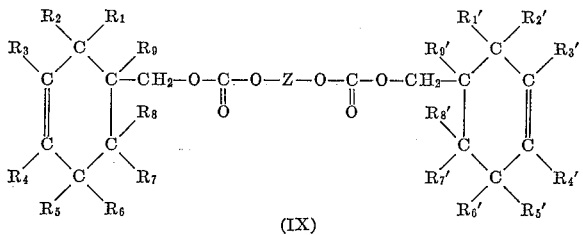
(IX)

in which $R_1$ to $R_9$, $R_1'$ to $R_9'$ and Z have the same meaning as in the Formula I.

These starting materials can themselves be prepared by reacting in a first stage 1 mol of an alcohol of the Formula VIII with 1 mol of phosgene to yield the chloroformic acid ester of the formula

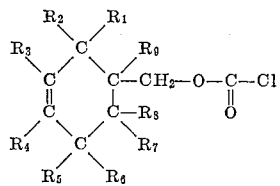
(X)

and in a second stage 2 to x moles of chloroformic acid ester of the Formula X are then condensed with 1 mol of a polyhydroxy compound containing x hydroxyl groups by a known method (x is a whole number, at least 2).

Alternatively, 1 mol of the polyhydroxy compound containing x hydroxyl groups concerned can first be reacted with 2 to x mols of phosgene to yield a polychloroformic acid ester of the formula

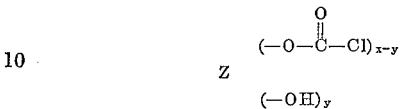

(y being at most equal to x−2), which is then condensed with 2 to x mols of an alcohol of the Formula VIII.

Polyhydroxy compounds suitable for reaction with a chloroformic acid ester are saturated or unsaturated dihydric or polyhydric alcohols, and preferable dihydric and polyhydric phenols.

Examples of saturated dihydric and polyhydric alcohols are: Ethylene glycol, 1:2-propanediol, 1:3-propanediol, glycerol, 1:3-butanediol, 1:4-butanediol, 1:5-pentanediol, 2-methyl-n-pentanediol-2:4, n-hexanediol-2:5, 2-ethylenhexanediol-1:3, 2:4:6-hexanetriol, trimethylolethane, trimethylolpropane, 2:2'-dihydroxy-di-n-propyl ether, butanetriol-(1:2:4), diethylene glycol, triethylene glycol, erythritol, xylitol, arabitol, sorbitol, mannitol, dulcitol, talitol, iditol, abonitol and pentaerythritol, heptitols, 2:2:6:6-tetramethylolcyclohexanol-(1); cis- and trans-1:4-dihydroxycyclohexane (cis- and trans-quinitol) and 1:4-dihydroxy-5-chlorocyclohexane. Furthermore, polyhydric alcohols that also contain other functional groups, for example sugars, such as glucose, galactose, mannose, fructose, cane sugar, and the like; sugar acids, such as glucuronic acid, galacturonic acid, mucic acid and the like. Finally there may be used as polyhydric alcohols polymers containing free hydroxyl groups, such as polysaccharides and more especially polyvinyl alcohol or partially hydrolyzed polyvinyl acetal.

As examples of unsaturated polyhydric alcohols may be mentioned: Butene-(2)-diol-(1:4), glycerol monoallyl ether, butanetriol-(1:2:4)-monoallyl ether and the like, and more especially dihydric alcohols of the formula

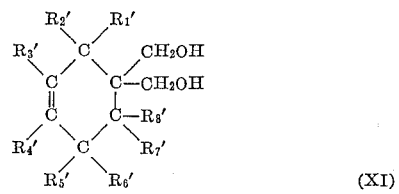
(XI)

in which $R_1'$ to $R_8'$ have the same meanings as in the Formula I, for example 1:1-bis-[hydroxymethyl]-cyclohexene-(3),
1:1-bis-[hydroxymethyl]-6-methylcyclohexene-(3),
1:1-bis-[hydroxymethyl]-2:4:6-trimethylcyclohexene-(3),
1:1-bis-[hydroxymethyl]2:5-methylenecyclohexene-(3) and
1:1-bis-[hydroxymethyl]-4-chlorocyclohexene-(3).

Examples of suitable dihydric and polyhydric phenols are: Resorcinol, pyrocatechol, hydroquinone, 1:4-dihydroxy-5-chlorobenzene, 1:4-dihydroxynaphthalene, 1:5-dihydroxynaphthalene, bis-[4-hydroxyphenyl]-methane, bis-[4-hydroxyphenyl]-methylphenylmethane, bis-[4-hydroxyphenyl]-tolylmethane, 4:4'-dihydroxydiphenyl, bis-[4-hydroxyphenyl]-sulphone; chlorinated bisphenols such as bis-[3-chloro-4-hydroxyphenyl]dimethylmethane; condensation products of phenols, such as cresol or phenol, with formaldehyde (novolaks), 1:1:3-tris-[4'-hydroxyphenyl]-propane, 1:1:2-tris-[4'-hydroxy-3':5'-dimethylphenyl]-propane, 1:2:2:2-tetrakis-[4-hydroxyphenyl]-ethane, 1:1:3:3-tetrakis-[4-hydroxyphenyl]-propane, 1:1:3:3-tetrakis-[3-chloro-4-hydroxyphenyl]-propane, $\alpha:\alpha:\alpha'$: $\alpha'$-tetrakis-[4''-hydroxyphenyl]-1:4-dimethylbenzene, α:α:α':α' - tetrakis - [4" - hydroxyphenyl] - 1:4 - diethylbenzene and more especially bis-[4-hydroxyphenyl]-dimethylmethane.

It will be realized that the polyepoxides of the invention may contain further functionally converted groups which depend on the polyhydroxy compound from which the polyepoxide in question is derived. More especially, in addition to the esterified hydroxyl groups of the polyhydric alcohol there may be present free hydroxyl groups so that certain properties, such as the duration of the hardening, the adhesivity or hydrophility of the epoxides of the invention can be modified within wide limits.

The polyepoxides of the invention react with the usual hardeners for polyepoxy compounds so that they can be crosslinked or hardened with such hardeners in a manner similar to that of other polyfunctional epoxy compounds or epoxy resins. As such hardeners may be used basic or more especially acidic compounds.

Satisfactory results have been obtained with the following hardeners: amines or amides, such as aliphatic and aromatic primary secondary and tertiary amines, for example mono-, di- and tributylamines, para-phenylenediamine, bis-[para-aminophenyl]-methane, ethylenediamine, N:N-diethylethylenediamine, diethylene triamine, tetra-[hydroxyethyl]-diethylene triamine, triethylene tetramine, tetraethylene pentamine, trimethylamide, diethylamine, triethanolamine, Mannich's bases, piperidine, piperazine, guanidine and guanidine derivatives such as phenylguanidine, diphenylguanidine, dicyandiamide, aniline-formaldehyde resins, urea-formaldehyde resins, melamine, formaldehyde resins, polymers of aminostyrenes, polyamides, for example those composed of aliphatic polyamines and dimerized or trimerized unsaturated fatty acids, isocyanates, isothiocyanates; polyhydric phenols, for example resorcinol, hydroquinone, bis-[4-hydroxyphenyl]-dimethylmethane, quinone, phenol-aldehyde resins, oil-modified phenol-aldehyde resins, reaction products of aluminum alcoholates or phenolates with compounds of tautomeric reaction of the type of acetoacetic ester, Friedel-Crafts catalysts, for example aluminum chloride, antimony chloride, tin tetrachloride, ferric chloride, zinc chloride, boron trifluoride and complexes thereof with organic compounds; phosphoric acid. Preferred hardeners are polybasic carboxylic acids and anhydrides thereof, for example phthalic anhydride, methylendomethylene-tetrahydrophthalic anhydride, dodecenylsuccinic anhydride, hexahydrophthalic anhydride, hexachloroendomethylene-tetrahydrophthalic anhydride or endomethylene-tetrahydrophthalic anhydride or mixtures thereof; maleic or succinic anhydride. If desired, the hardener may incorporate an accelerator, such as a tertiary amine, or advantageously a polyhydroxy compound, such as hexanetriol or glycerol.

The present invention is based on the observation that for hardening the epoxides of the invention with carboxylic acid anhydrides it is of advantage to use for every gram equivalent of epoxide group only about 0.3 to 0.9 gram equivalent of anhydride group.

When a basic accelerator, such as an alkali metal alcoholate or alkali metal salt of a carboxylic acid is used, up to 1.0 gram equivalent of anhydride group may be used.

The term "hardening" as used in this context signifies the conversion of the specified epoxide compounds into insoluble and infusible resins.

Accordingly, the present invention also includes hardenable mixtures containing a polyepoxide of the invention and a hardener for epoxy resins, such as primarily an anhydride of a dicarboxylic or polycarboxylic acid.

The hardenable mixtures of the invention further contain with advantage a proportion of otherwise suitable polyepoxides the epoxide groups of which are, however, wholly or partially hydrolyzed to hydroxyl groups, and/or other cross-linking polyhydroxy compounds such as hexanetriol. They may further contain a monoepoxide, such as cresyl glycide, as active diluent.

It will be understood that other polyepoxides may be incorporated with the hardenable epoxides of the invention, such, for example, as mono- or polyglycidyl ethers of monohydric or polyhydric alcohols, such as butanol, 1:4-butanediol or glycerol, or of monohydric or polyhydric phenols, such as resorcinol, bis-[4-hydroxyphenyl]-dimethylmethane or condensation products of aldehydes with phenols (novolaks), also polyglycidyl esters of polycarboxylic acids, such as phthalic acid, and also amino-polyepoxides such as are obtained, for example, by dehydrohalogenating a reaction product of an epihalohydrin with a primary or secondary amine, such as n-butylamine, aniline or 4:4'-di-[monoethylamino] diphenylmethane.

The hardenable epoxide compounds of the invention, as well as their mixtures with hardeners, may be admixed with fillers, plasticisers, coloring matter and the like at any stage prior to the hardening. Suitable extenders and fillers are, for example, asphalt, bitumen, glass fibers, mica, quartz powder, cellulose, kaolin, finely divided silicic acid (aerosil) or metal powders.

The mixtures containing an epoxide compound of the invention and a hardener can be used in the unfilled or filled state, if desired in the form of solutions or emulsions, as textile assistants, laminating resins, paints, lacquers, dipping resins, casting resins, coating compositions, filler, putties, adhesives and the like, and can also be used in the manufacture of such products. The new resins are especially valuable as insulating compounds for electrical purposes.

Parts and percentages in the following examples are by weight, and the relationship between part by weight to part by volume is the same as that between the kilogram and the liter.

EXAMPLE 1

*Manufacture of bis-[Δ³-tetrahydrobenzyl]-carbonate*

224 parts (2 mols) of Δ³-tetrahydrobenzyl alcohol, 224 parts of pyridine and 550 parts of anhydrous ethyl ether are mixed in a reaction vessel equipped with stirring means, and at an internal temperature of 20 to 25° C. 106.5 parts (1.075 mols) of phosgene are introduced within 4 hours. Pyridine hydrochloride settles out in the form of white crystals. The whole is allowed to react while being stirred for 2 hours, and 1000 parts by volume of ice water are then added. The lower aqueous layer, in which pyridine hydrochloride is dissolved, is then separated and the etheral solution of the carbonate formed is washed 3 times with 500 parts by volume of ice water on each occasion. The solvent (ether) is evaporated under atmospheric pressure, and the residue is freed in a water-jet vacuum from residual traces of water and pyridine. The residue is distilled in a high vacuum of 0.15 mm. Hg. After a fore-running of about 13 parts (up to 155° C.) a main fraction is obtained which passes over uniformly at 155 to 160° C. Yield: 225.7 parts, corresponding to 90.3% of theory. $D_{20°}=1.0552$; $n_D^{20}=1.4919$; bromine titre 95.7% of theory. Distillation residue: about 4.0 parts.

*Manufacture of bis-[3:4-epoxyhexahydrobenzyl]-carbonate*

A solution of 208 parts of bis-[Δ³-tetrahydrobenzyl] carbonate in 1000 parts of benzene is treated with 3 parts of sodium acetate, and at about 30° C. with ice-cooling and stirring 415 parts of peracetic acid of 42% strength are added dropwise within 1 hour. The mixture is then kept for 4 hours at 30° C. The benzene solution is washed with water and dilute sodium carbonate solution until it is free from acid, dried over sodium sulfate and evaporated, to yield 138 parts of liquid diepoxide containing per kg. 6.06 epoxide equivalents.

*Manufacture of a casting*

38 parts of phthalic anhydride are added at 40 to 70° C. to 50 parts of diepoxide. At about 100° C. a clear solution is obtained which is poured into an aluminum mould. After about 3 hours at 120° C. the substance jells. The casting is hardened for 5 hours at 120° C. and then for 10 hours at 140° C.; it possesses the following mechanical properties:

Bending strength _____ Kg./mm.$^2$__ 10.57
Impact bending strength _____cm. kg./cm.$^2$__ 9.07

EXAMPLE 2

When in the process described in Example 1, 224 parts of $\Delta^3$-tetrahydrobenzyl alcohol are replaced by an equivalent proportion of 6-methyl-$\Delta^3$-tetrahydrobenzyl alcohol, bis-[6-methyl-$\Delta^3$-tetrahydrobenzyl]-carbonate is obtained. The yield amounts to 85.5% of the theoretical yield.

A solution of 106 parts of bis[-6-methyl-$\Delta^3$-tetrahydrobenzyl]-carbonate in 350 parts by volume of benzene and 1.5 parts of sodium acetate is treated at 30° C., while being cooled, with 191 parts of peracetic acid of 42% strength. The mixture is maintained for 3 hours at 20 to 23° C. and then for 4 hours at 30° C. The benzene solution is washed free from acid with water and dilute sodium carbonate solution, dried over sodium sulfate and evaporated in vacuo on a water-bath. The residue consists of 100 parts of diepoxide containing per kg. 4.64 epoxide equivalents.

EXAMPLE 3

A mixture of 69.1 parts of methyl-2:5-endomethylene-$\Delta^3$-tetrahydrobenzyl alcohol and 29.6 parts of diethyl carbonate is treated with solid sodium ethylate (prepared from 0.2 part of sodium and absolute ethanol). The mixture is heated on an oil bath maintained at 150 to 160° C. and in the course of 2 days the alcohol formed is distilled off together with 120 parts by volume of benzene (added in 4 portions) through a column of Raschig rings 30 cm. high. The catalyst is filtered off and the filtrate is distilled.

55 parts of bis-[methyl-2:5-endomethylene-$\Delta^3$-tetrahydrobenzyl]-carbonate are obtained at 137° C. under a pressure of 0.04 mm. Hg.

A solution of 45.3 parts of the carbonate described above in 200 parts by volume of benzene is treated with 5 parts of anhydrous sodium acetate and 72 parts of peracetic acid of 42% strength are stirred in portionwise with cooling. The temperature is maintained for another hour at 30 to 33° C. The cooled benzene solution of the epoxide is washed free from acid with water and 2 N-sodium carbonate solution, dried over sodium sulfate, filtered and evaporated, to yield a liquid diepoxide the epoxide content of which cannot be determined with hydrobromic acid in glacial acetic acid.

EXAMPLE 4

*$\Delta^3$-tetrahydrobenzyl chloroformate*

In the course of 40 minutes 336 parts of $\Delta^3$-tetrahydrobenzyl alcohol are added dropwise to a solution of 530 parts of phosgene in 1500 parts by volume of ether, while maintaining the temperature below 10° C. The mixture is then refluxed for 1 hour, the solvent is evaporated and the residue is distilled in a water-jet vacuum, to yield 501 parts of $\Delta^3$-tetrahydrobenzyl chloroformate boiling at 86° C. under a pressure of 10 mm. Hg.

*2:2-di-(para-hydroxyphenyl)-propane-bis-($\Delta^{3'}$-tetrahydrobenzyl carbonate)*

228 parts of 2:2-di-(para-hydroxyphenyl)-propane are dissolved in a mixture of 700 parts by volume of chloroform and 160 parts of anhydrous pyridine, and 350 parts of $\Delta^3$-tetrahydrobenzyl chloroformate are stirred in dropwise. The temperature is maintained at 3–9° C. with cooling. The mixture is then left to itself for 15 hours at room temperature. The solution is washed at 0° C. with 400 parts of water, 100 parts by volume of 2 N-hydrochloric acid, 250 parts by volume of 2 N-sodium hydroxide solution and 50 parts by volume of monosodium phosphate solution, dried over sodium sulfate and evaporated, to yield 505 parts of a crystalline product.

For the purpose of analysis a test portion of the product is crystallized from methanol. Melting point: 60 to 61° C.

Analysis ($C_{31}H_{36}O_6$)—Calculated: C, 73.78%; H, 7.19%. Found: C, 73.88%; H, 7.28%.

*2:2-di-(para-hydroxyphenyl)-propane-bis-(3':4'-epoxyhexahydrobenzyl carbonate)*

A solution of 473 parts of 2:2-di-(para-hydroxyphenyl)-propane-bis-($\Delta^{3'}$-tetrahydrobenzyl carbonate) in 2000 parts by volume of benzene is treated with 50 parts of anhydrous sodium acetate, and in the course of 1 hour 450 parts of peracetic acid of 42% strength are stirred in. The temperature is maintained by cooling at 29 to 31° C. After the mixture has reacted for 100 minutes at 30° C., 98% of the theoretical amount of peracetic acid has been consumed. The benzene solution is washed three times with 500 parts of ice water and 300 parts by volume of 2 N-sodium carbonate solution, dried over sodium sulfate and evaporated. The aqueous phase is extracted with 500 parts by volume of benzene, and the benzolic extract is combined with the main portion. The last remnants of solvent are removed by heating to 150° C. in a high vacuum. Yield: 466 parts of diepoxide containing per kg. 3.4 epoxide equivalents.

63 parts of epoxide and 27 parts of phthalic anhydride are melted and mixed, and the melt is poured into an aluminum mould. The mixture jells after 21 minutes at 120° C. After having been hardened for 2 hours at 120° C. and then for 24 hours at 160° C., the casting possesses the following properties:

Bending strength _____ kg./mm.$^2$__ 13.5
Impact bending strength _____cm. kg./cm.$^2$__ 13.9
Thermal stability according to Martens _____° C__ 170

EXAMPLE 5

*Ethyleneglycol-bis-($\Delta^3$-tetrahydrobenzyl carbonate)*

A mixture of 112 parts of $\Delta^3$-tetrahydrobenzyl alcohol, 500 parts by volume of anhydrous benzene and 120 parts of anhydrous pyridine is treated dropwise at 5 to 10° C. with 93.5 parts of ethyleneglycol-bis-chloroformate. The precipitated pyridine hydrochloride is filtered off. The filtrate is washed at 0° C. twice with 300 parts by volume of 2 N-hydrochloric acid and 50 parts by volume of 2 N-potassium bicarbonate solution, dried over sodium sulfate and evaporated. Distillation of the residue yields 118 parts of ethyleneglycol-bis-($\Delta^3$-tetrahydrobenzyl carbonate) boiling at 169 to 171° C. under a pressure of 0.07 mm. Hg.

*Ethyleneglycol-bis-(3:4-epoxyhexahydrobenzyl carbonate)*

A mixture of 102 parts of ethyleneglycol-bis-($\Delta^3$-tetrahydrobenzyl carbonate) and 600 parts by volume of chlorobenzene is treated with 180 parts of peracetic acid of 33% strength which is free from sulfuric acid, and the mixture is kept for 2 hours at 30° C. and then for 3 hours at 5° C. The supernatant phase is evaporated in a rotary evaporator under a water-jet vacuum. The last remnants of solvent are removed at 100° C. in a high vacuum. The resulting diepoxide contains per kg. 4.4 epoxide equivalents.

EXAMPLE 6

A solution of 89.2 parts of commercial 2:4-dihydroxy-3-hydroxymethyl-pentane in 160 parts of anhydrous pyridine and 500 parts by volume of benzene is treated with stirring in the course of 40 minutes at 6 to 10° C. with 349 parts of $\Delta^3$-tetrahydrobenzyl chloroformate. The mixture is kept for 3 hours at room temperature and then heated for 2 hours at 60° C., then cooled, the pyridine hydrochloride formed is filtered off and rinsed on the filter with 500 parts by volume of benzene.

The filtrate is mixed with 40 parts of anhydrous sodium acetate, and in the course of 1 hour 460 parts of peracetic acid of 42% strength are stirred in, while cooling to maintain the temperature at 30° C. After another 2 hours at 28 to 30° C. the benzene solution is washed 3 times with 300 parts of water, 300 parts by volume of 2 N-sodium carbonate solution and 50 parts by volume of molar monosodium phosphate solution. The aqueous phase is extracted with 500 parts by volume of benzene. The combined benzene solutions are dried over sodium sulfate, filtered and evaporated, towards the end at 120° C. in a high vacuum.

Yield: 313 parts of a viscid resin containing per kg 4.37 epoxide equivalents.

EXAMPLE 7

10.2 parts of a novolak (prepared from phenol and formaldehyde in the molecular proportions of 3:2, in the presence of oxalic acid) are dissolved in 100 parts by volume of N-sodium hydroxide solution, and 17.5 parts of Δ³-tetrahydrobenzyl chloroformate are stirred in dropwise, while cooling to maintain the temperature at about 25° C. The product is taken up in 150 parts by volume of chloroform and the solution is dried over sodium sulfate, filtered and evaporated. The last remnants of solvent are removed by heating on a waterbath in a high vacuum. Yield: 20.3 parts of a brown resin.

A solution of the above carbonate in 150 parts by volume of chloroform is mixed with 2.5 parts of anhydrous sodium acetate and then with cooling to about 30° C. with 25 parts of peracetic acid of 42% strength. The mixture is allowed to react for 1 hour with stirring at about 30° C., cooled with ice, diluted with 200 parts by volume of benzene and washed free from acid with water and 2 N-sodium carbonate solution. The solution is dried, filtered and evaporated. Yield: 21.5 parts of a resin containing per kg. 2.56 epoxide equivalents.

EXAMPLE 8

*6-methyl-Δ³-tetrahydrobenzyl-chloroformate*

126 parts of 5-methyl-Δ³-tetrahydrobenzyl alcohol are added to 212 parts of phosgene in 700 parts by volume of ether at 9° C. The mixture is boiled under reflux for 2 hours. The solvent is evaporated and the residue distilled. 173 parts of 6-methyl-Δ³-tetrahydrobenzyl chloroformate boiling at 92–94° C. under 9 mm. of pressure are obtained.

*2:2-di-(para-hydroxyphenyl)-propane-bis-(6'-methyl-3':4'-epoxyhexahydrobenzyl carbonate)*

91.2 parts of 2:2-di-(para-hydroxyphenyl)-propane are dissolved in a mixture of 300 parts by volume of ethylene chloride and 72 parts of dry pyridine. 160.5 parts of 6-methyl-Δ³-tetrahydrobenzyl chloroformate are added dropwise with stirring. The temperature is maintained at 0–10° C. with cooling. The mixture is diluted with 500 parts by volume of benzene and washed at 0° C. with 200 parts of water, twice with 200 parts by volume of 2 N-hydrochloric acid and 200 parts by volume of 2 N-sodium bicarbonate solution.

To the solution of the carbonate there are added 18 parts of anhydrous sodium acetate and, in the course of 30 minutes at 30° C. with stirring, 180 parts of peracetic acid of 42% strength. The whole is allowed to react for 3½ hours at 23–30° C. The reaction mixture is washed three times with 300 parts of water and 200 parts by volume of 2 N-sodium carbonate solution, dried over sodium sulfate and evaporated. 206 parts of diepoxide containing per kg. 3.36 epoxide equivalents are obtained.

What is claimed is:
The compound of the formula

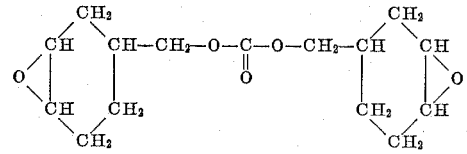

References Cited by the Examiner

UNITED STATES PATENTS

| | | | |
|---|---|---|---|
| 2,750,395 | 6/1956 | Phillips et al. | 260—348 |
| 2,795,572 | 6/1957 | Mueller et al. | 260—348 |
| 2,848,426 | 8/1958 | Newey | 260—348 |
| 2,917,491 | 12/1959 | Phillips et al. | 260—348 |
| 2,988,554 | 6/1961 | Batzer et al. | 260—348 |

WALTER A. MODANCE, *Primary Examiner.*

IRVING MARCUS, DUVAL T. McCUTCHEN,
*Examiners.*

SAM ROSEN, G. K. MILESTONE, JAY P. FRIEDENSON, NORMA S. MILESTONE, *Assistant Examiners.*